US005296668A

United States Patent [19]

Foreman et al.

[11] Patent Number: 5,296,668

[45] Date of Patent: Mar. 22, 1994

[54] GAS COOLED CATHODE FOR AN ARC TORCH

[75] Inventors: Craig Foreman, St. Ives; Peter Vierboom, Turramurra, both of Australia

[73] Assignees: The University of Sydney; The Electricity Commission of New South Wales, both of Australia

[21] Appl. No.: 910,138

[22] PCT Filed: Jan. 17, 1991

[86] PCT No.: PCT/AU91/00017

§ 371 Date: Jul. 14, 1992

§ 102(e) Date: Jul. 14, 1992

[87] PCT Pub. No.: WO91/11089

PCT Pub. Date: Jul. 25, 1991

[30] Foreign Application Priority Data

Jan. 17, 1990 [AU] Australia .............................. PJ8227

[51] Int. Cl.[5] ......................... B23K 9/00; B23K 10/00

[52] U.S. Cl. ......................... 219/121.48; 219/121.52; 219/121.45; 219/121.51; 219/119

[58] Field of Search ........... 219/121.52, 121.5, 121.51, 219/121.49, 75, 121.48; 313/231.31, 231.41, 231.21

[56] References Cited

U.S. PATENT DOCUMENTS

| | | | |
|---|---|---|---|
| 3,632,951 | 6/1972 | Klasson | 219/75 |
| 4,266,113 | 5/1981 | Denton et al. | 219/121.51 |
| 4,649,257 | 3/1987 | Yakolevitch et al. | 219/121.50 |

*Primary Examiner*—Mark H. Paschall
*Attorney, Agent, or Firm*—Townsend & Townsend Khourie & Crew

[57] ABSTRACT

A gas cooled cathode for a direct current plasma torch. The cathode has a tip connected to a body. A gas passage for working gas passes through the body of the cathode, passes proximate the tip and exits the body adjacent the tip. The cathode is spaced apart from and insulated from the anode by means of a collar of insulation material.

3 Claims, 3 Drawing Sheets

GAS COOLED CATHODE FOR AN ARC TORCH

TECHNICAL FIELD

This invention concerns a gas-cooled cathode for a direct current (dc) arc torch. Direct current arc torches should not be confused with transferred arc devices, such as TIG welders, where the anode comprises a workpiece. A sheath is provided around the cathode of TIG welders and a very high flow of inert gas (not working gas) is pumped through the sheath to Provide an inert environment and prevent oxidation of the cathode and workpiece.

Direct current arc torches should also not be confused with intermittent arc devices such as are proposed for jet engines.

In direct current arc torches a working gas is heated by a dc arc to create a plasma which then passes out of the torch through a nozzle comprising its hollow anode. The device operates continually over long periods of time, and the plasma may be used to ignite fuel, such as pulverized coal, in steam raising boilers used to generate electric power. The plasma may also be used to stabilize combustion of the coal, and in many other applications, for instance in blast furnaces and to obtain process heat.

BACKGROUND ART

Conventional direct current arc torches are water-cooled, and passages for the water usually pass through both the cathode and anode. Cooling is essential since it prevents the cathode from reaching temperatures where it deteriorates due to melting or boiling. Also, heat radiation from the cathode at high temperatures will make it impossible to control the arc. Working gas is conventionally injected directly into the space between the anode and the cathode, through passages in the insulation which separates them.

The water-cooled arrangement involves the connection of water pipes to the torch, and because water conducts electricity, the water circuit is required to be electrically isolated. There is a potential safety hazard in these systems since if one of the water hoses comes uncoupled during use, a jet of hot, and possibly high voltage, water can be sprayed out in an uncontrolled fashion.

SUMMARY OF THE INVENTION

According to the present invention, there is provided a gas-cooled cathode for a direct current arc torch. The cathode has a tip connected to a body. A gas passage for working gas passes through the body of the cathode, passes proximate the tip and exits the body adjacent the tip. The cathode is spaced apart from and insulated from the anode by means of a collar of insulating material.

All the working gas required to sustain the arc is supplied through the cathode and cools it on the way to the ntry of the anode.

A swirler surrounds the tip of the cathode, downstream of ports through which the working gas exits the body. Swirling the gas improves the stability of the arc in the region of the cathode, and rotates the anode root, which reduces erosion of the anode. In a highly preferred embodiment this swirler is made of metal and as the torch heats up to its operating temperature it expands and seals against the collar which insulates the cathode from the anode.

In a particularly advantageous embodiment of the invention the gas passage through the cathode communicates the tip such that working gas contacts the tip as it passes through the cathode.

BRIEF DESCRIPTION OF THE DRAWINGS

The invention will now be described by way of example only, with reference to the accompanying drawings, in which.

BEST MODE FOR CARRYING OUT THE INVENTION

Figure 1:
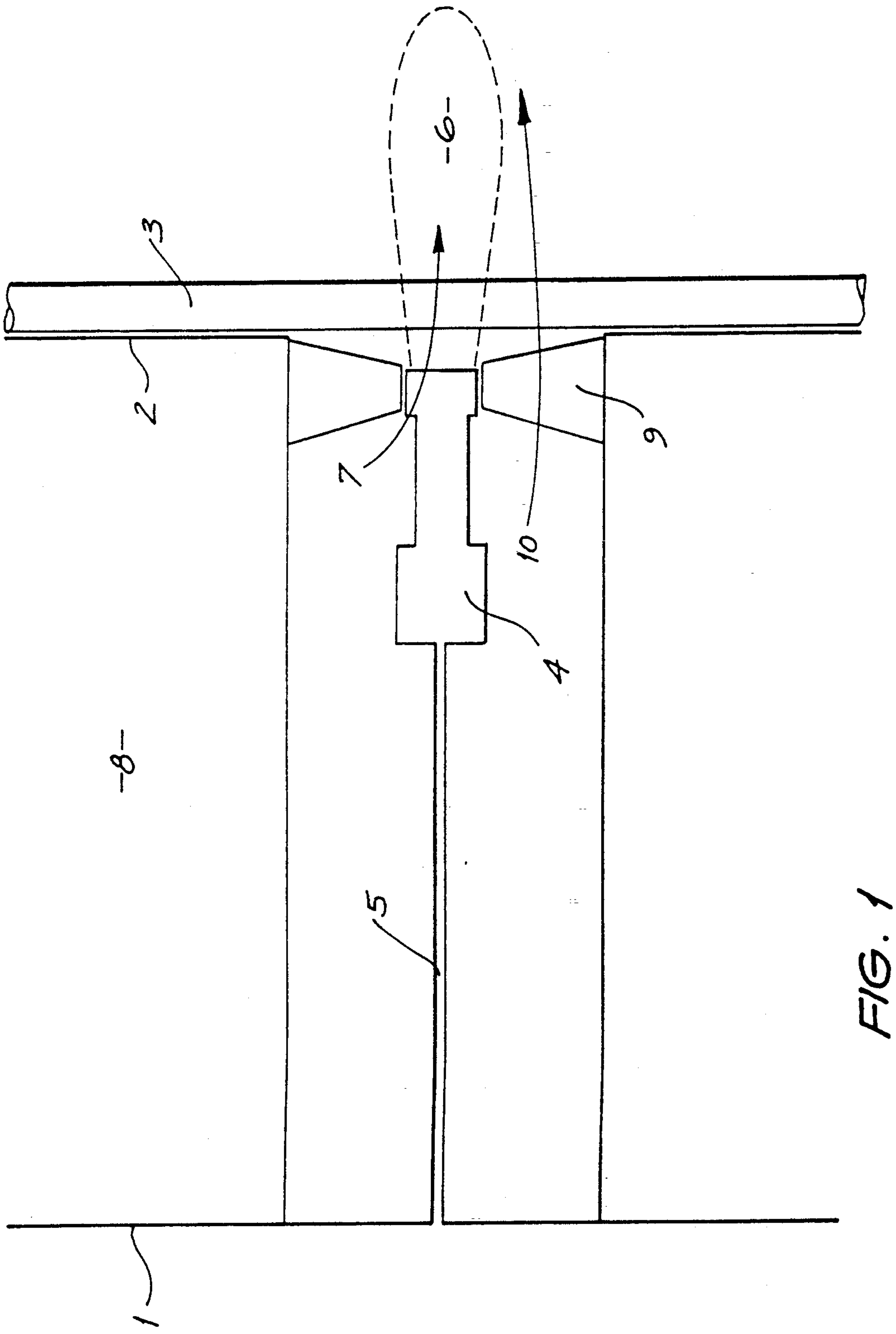
FIG. 1 is a schematic section through the wall of a steam raising boiler in which an arc torch embodying the invention may be used.

Referring first to FIG. 1, a typical steam raising boiler has an outer wall 1 and an inner wall 2 lined with water tubes 3. A cavity in the wall houses a direct current arc torch 4. A passage 5 extends from the outer wall 1 to supply working gas to the arc torch.

In use, arc torch 4 emits a tongue of plasma indicated generally by the region 6, into the interior of the boiler to heat the water in tubes 3. Coal dust is pumped, through ducts which are not indicated other than schematically by arrow 7, directly into the plasma which increases the energy yield; typically giving a ten-fold increase in energy yield. Air from secondary air chamber 8 is mixed with more coal dust and pumped through a swirler 9, in the direction generally indicated by arrow 10, into the region of the plasma where it is ignited, further increasing the energy yield; again typically producing a ten-fold increase in energy yield.

Figure 2A:
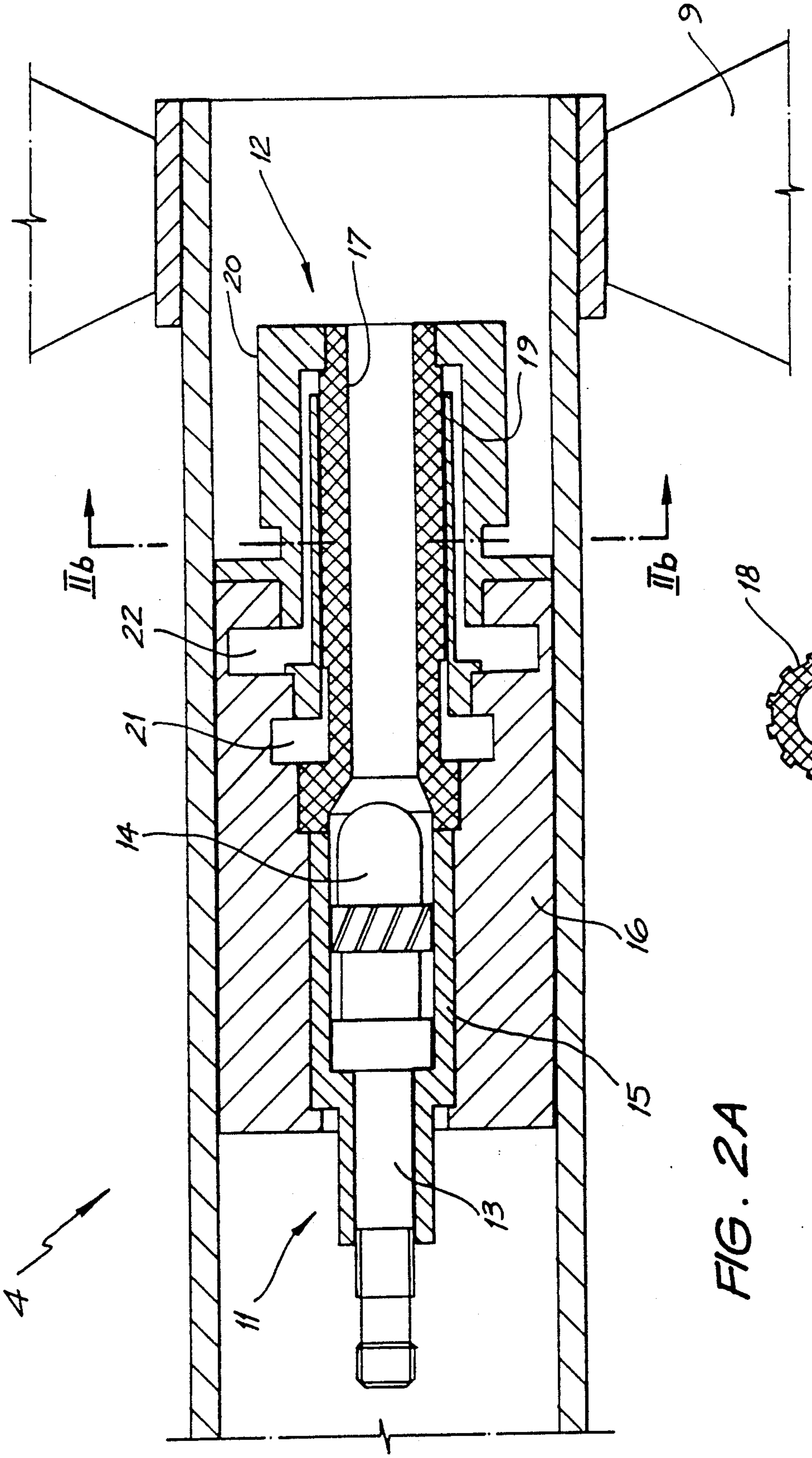
FIG. 2*a* is a elevational and part sectional view of an arc torch embodying the present invention.

Arc torch 4, which is shown in more detail in FIG. 2, comprises a cathode indicated generally at 11 and a hollow anode indicated generally at 12. The cathode comprises a copper cathode body 13 (seen best in FIG. 3*a*) and a thoriated tungsten tip 14 (best seen in FIG. 3*b*). An insulating ceramic (macor) collar 15 surrounds the cathode, and this in turn is surrounded by a brass cathode housing 16. The anode 17 itself is copper, and it is spaced apart and insulated from the cathode by collar 15.

Figure 2B:
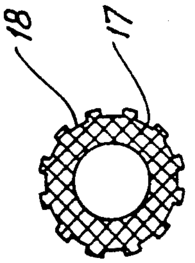
FIG. 2*b* is a cross-sectional view of the anode of FIG. 2*a* taken along the section lines II*b*—II*b;*

The outer surface of the anode has longitudinally extending grooves 18, seen in FIG. 2*b*, and is surrounded by a brass water guide 19 to define water the passages extending longitudinally along the outside of the anode. A brass anode housing 20 serves to support the anode and water guide. An annular water inlet chamber 21 allows cooling water to be pumped, in use, along the passageways which extend longitudinally along the outside of the anode. This water then circulates back down the outside of the water guide 19 to an annular water outlet chamber 22.

Figure 3A:
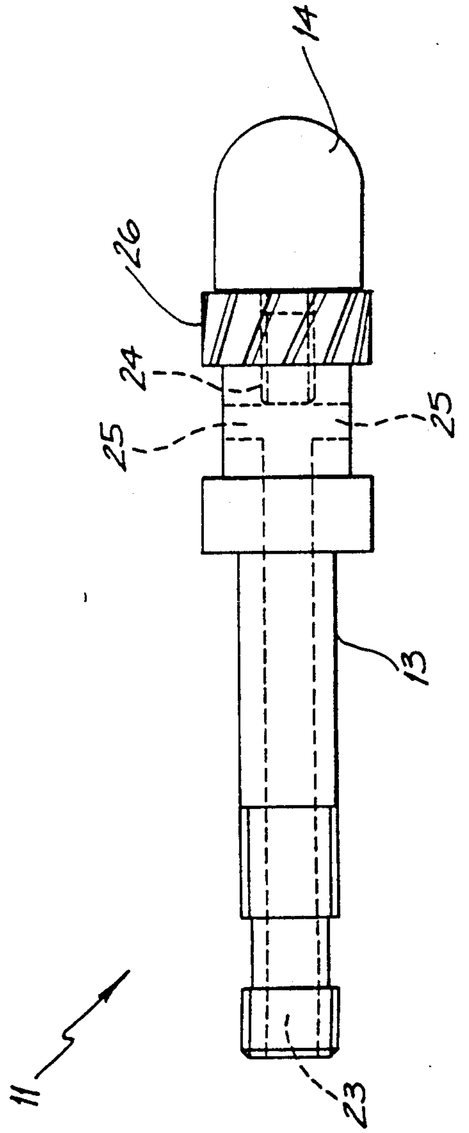
FIG. 3*a* is a elevational view of the cathode of FIG. 2*a*.

Turning now to FIG. 3*a*, the structure of the cathode 11 will be explained in greater detail. The cathode body 13 is penetrated from its outer end by an axially extending gas channel 23. Gas channel 23 is in communication with an internally threaded channel 24 which extends into the cathode body from the inner end. Radially extending passages 25 extend outward from gas channel 23 where it meets channel 24. A copper swirler 26 is positioned at the innermost end of cathode body 13 and extends radially outward.

Figure 3B:
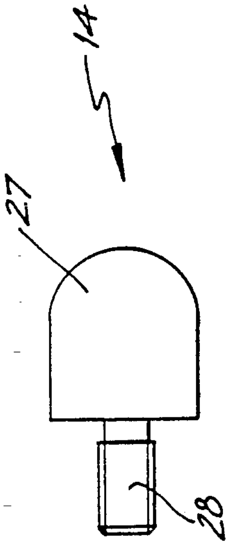
FIG. 3*b* is an elevational view of the cathode tip of FIG. 3*a*.

Cathode tip 14 comprises a domed end 27 with an axially extending externally threaded stem 28; see FIG. 3*b*. The tip is screwed into cathode body 13 and the thread on stem 28 intermeshes with the internal thread of channel 24 so that stem 18 completely obstructs passage 24 and the extremity of the stem is adjacent the end of gas channel 23.

In use, a non-oxidizing working gas such as nitrogen is pumped through passage 5 and into channel 23. The working gas impinges on the extremity of stem 28 and exits the cathode via radially extending passages 25. The gas is confined by the stepped profile of the cathode body and the insulating collar 15 and is forced through the swirler 26 to be energized into a plasma within the hollow interior of anode 17 by electric discharge between cathode tip 14 and anode 17.

The nitrogen is cool as it travels through channel 23 and strikes the extremity of stem 28 to keep the entire tip 14 cool during operation. The gas also keeps body 13 cool.

Swirler 26 is typically fabricated from a metal such as copper, and as the torch heats to working temperature it expands to contact the interior surface of insulating collar 15 and creates a seal.

It has been found in practice that the geometry of the torch and the operating conditions must be carefully chosen if an arc torch embodying the invention is to operate satisfactorily over extended periods of time. In one working embodiment the cathode tip 14 has a diameter of 2.0 mm and a length of 25 mm, and the threaded stem 28 extends from the back about 10 mm. Gas passage 23 is about 7 mm in diameter and Nitrogen is pumped through at a rate of about 2.5 gm/sec. With 300 V and 200 A supplied to the arc, the temperature reached by swirler 26 does not exceed 800° C.

Although the invention has been described with reference to a particular embodiment, it should be appreciated that it may be embodied in many other forms. For instance, the gas passages may extend through the cathode in other configurations. Gas cooling may also be provided to anode 12 if desired. It should also be appreciated that thoriated tungston is not strictly the only material from which the cathode tip may be made, but it must be made from material having a high melting point, and capable of thermionic emission.

We claim:

1. A gas cooled cathode for a direct current arc torch comprising:

a body having a tip;

a gas passage for working gas which passes through the body, passes proximate the tip and exits the body adjacent the tip through ports; and a swirler surrounding the tip of the cathode and being downstream of the ports.

2. A gas cooled cathode for a direct current arc torch of the type including an anode and an insulating collar housing the cathode, comprising:

a body having a tip;

a gas passage for working gas which passes through the body, passes proximate the tip, and exits the body adjacent the tip through ports; and a swirler surrounding the tip of the cathode and being downstream of the ports, the swirler being made of metal and being sized so that in use, as the torch heats up to an operating temperature the swirler expands and seals against the collar which electrically insulates the cathode from the anode.

3. A gas cooled cathode as claimed in any previous claim, wherein:

the gas passage through the cathode communicates with the tip so that the working gas contacts the tip as it passes through the cathode.

* * * * *